United States Patent

Dammann

[11] 3,969,017
[45] July 13, 1976

[54] METHOD OF IMAGE ENHANCEMENT
[75] Inventor: Hans Dammann, Tangstedt, Germany
[73] Assignee: U.S. Philips Corporation, New York, N.Y.
[22] Filed: Feb. 6, 1975
[21] Appl. No.: 547,694

Related U.S. Application Data
[63] Continuation of Ser. No. 374,512, June 28, 1973, abandoned.

[30] Foreign Application Priority Data
July 1, 1972 Germany............................ 2232359

[52] U.S. Cl. ........................... 350/162 SF; 350/169
[51] Int. Cl.² ........................................ G02B 27/10
[58] Field of Search ............. 350/162 SF, 311, 169, 350/174; 178/DIG. 25

[56] References Cited
UNITED STATES PATENTS
3,703,640  11/1972  Broussaud et al. ............ 350/162 SF
3,883,436  5/1975  Fletcher .............................. 350/311

Primary Examiner—Ronald J. Stern
Assistant Examiner—Jon W. Henry
Attorney, Agent, or Firm—Frank R. Trifari; Simon L. Cohen

[57] ABSTRACT

A method of image enhancement is described. A number of images of different unsharpness are separately filtered and subsequently combined. The various filters have complementary apertures.

4 Claims, 3 Drawing Figures

METHOD OF IMAGE ENHANCEMENT

This is a continuation of Ser. No. 374,512, filed June 28, 1973, now abandoned.

The invention relates to a method of enhancing images of an object with the aid of inverse filters. The invention also relates to a device for the implementation of this method.

Known holographic methods of image enhancement, as for example described by G. W. Stroke in "Optica Acta" 16 (1969), pages 401–422, are after unsatisfactory, both fundamentally and practically.

Unsharp images can be expressed mathematically by convolution of an image function with an interference function (point image) so that the following expression applies to this unsharp image $b_u$:

$$b_u = b \otimes p \qquad (1)$$

where $b$ is the desired image function, $p$ is an interference function (point image) which is assumed to be known and $\otimes$ is the symbol for convolution.

Known methods of image enhancement by deconvolution are based on a dual Fourier transformation of (1). The first transformation of (1) yields:

$$B_u = B \times P \qquad (2)$$

where $B_u$, $B$, $P$ are the Fourier transforms to the frequency domain of $b_u$, $b$ and $p$. In the Fourier space this distribution is multiplied by $1/P$; thus:

$$1/P \times B_u = B \times P \times (1/p = B \qquad (3)$$

so that by a second - back - transformation of $1/P \times B_u$ the desired image function $b$ is obtained. In optical practice the multiplication by $1/P$ in the Fourier space is implemented with the aid of a filter having a filter function $1/P$ (hence "inverse" filter) in an optical Fourier transformation device. However, it is also possible that after the image function $b_u$ and the interference function $p$ have been applied to an electronic computing device, the Fourier transformations and the multiplication by $1/P$ may be performed purely arithmetically in a computer.

In most cases which have practical significance the function $P$ has zeros in the relevant frequency range, i.e. points, lines or areas whe $P = O$. In these areas the function $1/P$ has poles. Multiplication by $1/P$ in accordance with (3) is then meaningless and the method described then is fundamentally impractible.

Another practical and essential consideration is that the statistical interference (noise) near these zeros is disproportionately amplified due to the filter function $1/P$, which at these points assumes comparatively very high values relative to the other areas. This readily results in an impermissibly high noise level in the desired image.

When using inverse filters in optical Fourier transform devices, the absolute value of $1/P$ in the filter function cannot exceed 1. It is well-known (see for example B. J. Tsujiuchi in "Progress in Optics", Volume 2, 1963, North Holland Publishing Company, Amsterdam) that this leads to the rejection or the absence of frequency bands in the Fourier spectrum, generally resulting in an impermissible deterioration of the quality of the image obtained.

The object of the invention is to provide a method which does not have said drawbacks. The method according to the invention is characterized in that at least two images of different unsharpness, of the object, are separately filtered by filters with complementary apertures, and that the filtered images are superimposed.

The method according to the invention is based on the fact that in many cases of practical importance two or more unsharp images of a single object are available or can be formed, which images may be represented by $$b_{u1} = b \otimes p_1$$

$$b_{u2} = b \otimes p_2 \qquad (4)$$

Known examples of such images are radiographs which have been taken with the aid of X-ray sources having focal spots of a different size. It is also possible to use X-ray sources with different distributions of the focal spots.

The Fourier transforms of the functions according to (4) are:

$$B_{u1} = B \times P_1$$

$$B_{u2} = B \times P_2 \qquad (5)$$

Of course, the functions $P_1$ and $P_2$ each have zeros. However, it is now highly improbable that the zeros of the different functions coincide. In many cases, as for example in the case of said radiographs, the zeros of $P_1$ and $P_2$ can be substantially interrelated by an appropriate selection of the focal spots. The invention is based on the recognition that by means of suitable, complementary apertures, the zeros of $P_1$ and $P_2$ can be screened off. From two or more images of different unsharpness of a single object one sharp (or sharper) image can be formed using two or more inverse filters with complementary apertures.

The invention will now be further described, by way of example, with reference to the drawing, in which.

It is assumed that the Fourier transforms of the unsharp images (see equation (5)) are available. The total aperture of the Fourier plane is derived, by way of example, into two complementary apertures $A_1$ and $A_2$, such that $|P_1| \geq |P_2|$ for the range of the open aperture $A_1$ $|P_2| \geq |P_1|$ for the range of the open aperture $A_2$ \qquad (6)

Figure 1:
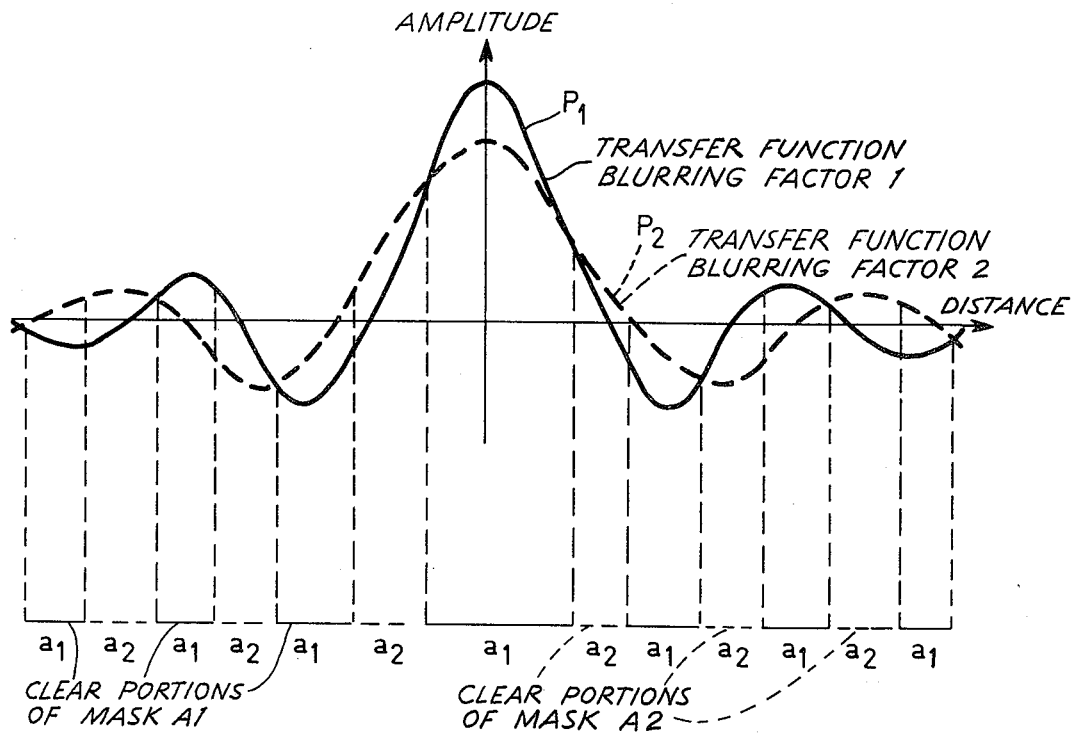
FIG. 1 shows a graph of the Fourier transforms $P_i$ and $P_2$ of the interference functions.

The functions $P_1$ and $P_2$ are plotted in FIG. 1. The ranges of the open apertures $A_1$ and $A_2$ are denoted by $a_1$ and $a_2$ respectively. If the previously described requirement that the zeros of $P_1$ and $P_2$ should not coincide is satisfied:

$|P_1| > 0$ in the ranges of open aperture $A_2$, i.e. in the ranges $a_1$, and $|P_2| > 0$ in the ranges of the open apertures $A_2$, i.e. in the ranges $a_2$. \qquad (7)

By including a filter $1/P_1$ in the aperture $A_1$ and a filter $1/P_2$ in the aperture $A_2$ it follows that (cf. (5)):

$1/P_1 \cdot B_{u1} = B$ in the aperture $A_1$ $1/P_2 \cdot B_{u2} = B$ in the aperture $A_2$ (8)

Consequently, since $A_1$ and $A_2$ together form the total aperture, the Fourier transform B of the desired image p is obtained in the total aperture. Moreover, B is obtained from the relevant maximum function values of $B_{u1}$ and $B_{u2}$, so that very little interference is introduced.

Figure 2:
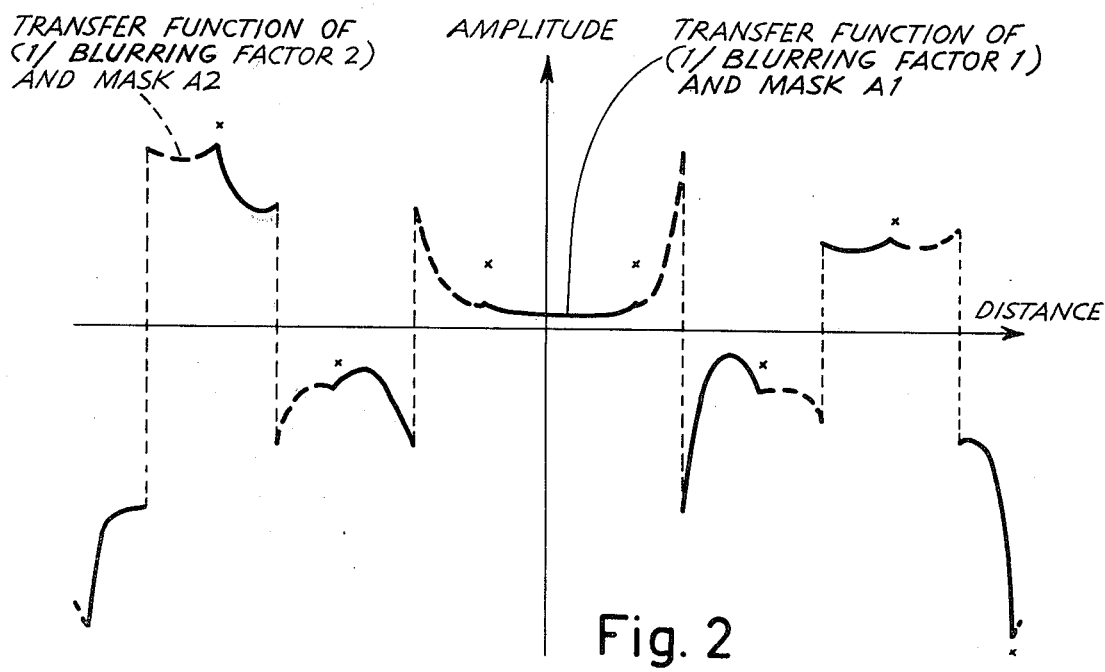
FIG. 2 illustrates the effect of the apertures on the filter functions $1/P_1$ and $1/P_2$.

FIG. 2 shows the variations of the corresponding filter functions $1/P_1$ and $1/P_2$, if these are inserted in the apertures $A_1$ and $A_2$. Instead of apertures which satisfy equation (6) it is also possible to select different aperture distributions which, however, should meet the requirement (7). However, generally the division according to (6) will be more favourable.

Figure 3:
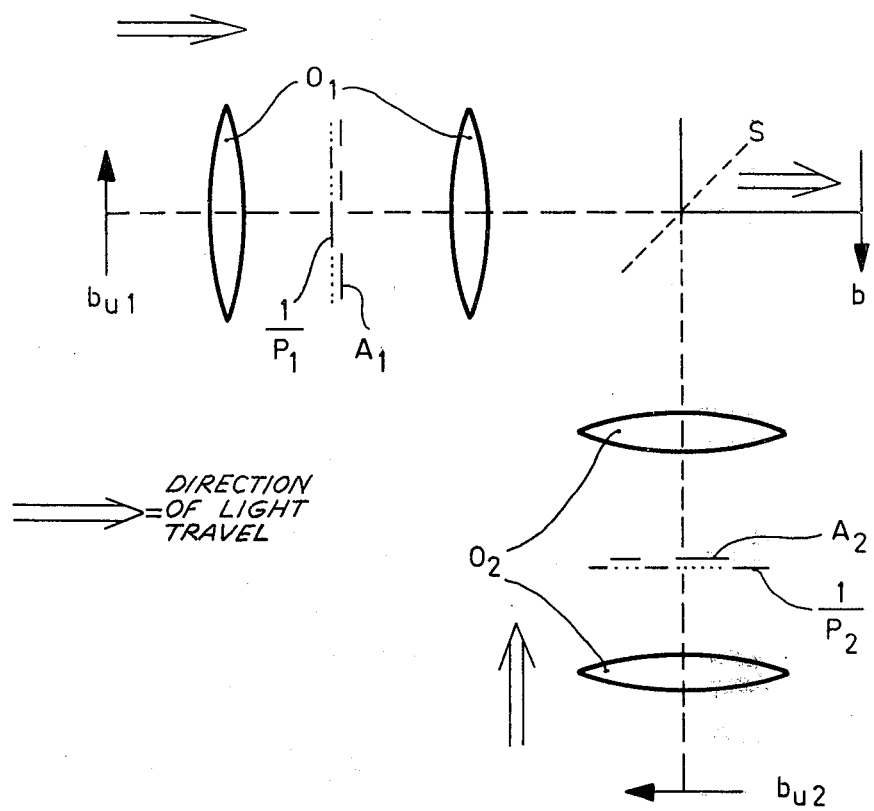
FIG. 3 shows a possible optical device for embodying the method according to the invention.

FIG. 3 shows a possible optical device for embodying the method according to the invention with the aid of two inverse filters $1/P_1$ and $1/P_2$, in front of which or behind which suitable apertures are arranged. These filters are arranged in the Fourier planes of the optical Fourier transformation systems $0_1$ and $0_2$. Such transformation systems are known per se, for example, from the previously mentioned publications. The unsharp images $b_{u1}$ and $b_{u2}$ are applied to separate optical systems and are separately filtered. As explained hereinbefore, filters $1/P_1$ and $1/P_2$ respectively cannot be realized near the zeros of $P_1$ and $P_2$. These areas of the filters are screened off by means of masks $A_1$ and $A_2$ whose apertures satisfy the requirement (6). Thus two complementary partial images of b are obtained, which by means of a semi-transparent mirror S can be combined to form the desired image b.

Instead of optical filtering, the image functions $b_{u1}$ and $b_{u2}$ and the known interference functions $p_1$ and $p_2$ may also be applied to an electronic computer. The Fourier transformers of the image functions can be multiplied by the inverse of the Fourier transforms $1/P_1$ and $1/P_2$ of the interference functions in the corresponding areas (apertures) $A_1$ and $A_2$ of the Fourier plane. Thus, the image b is composed purely arithmetically.

The two embodiments may also operate with more than two unsharp images with corresponding inverse filters whose apertures are suitably limited.

What is claimed is:

1. A method of enhancing blurred images of an object with the aid of inverse filters, comprising the steps of separately forming Fourier transforms of at least two blurred images of the object blurred by different blurring factors of different imaging sources into Fourier transforms, separately filtering the Fourier transforms by inverse filters each comprising the inverse of the Fourier transform of the blurring factor of the imaging source used to produce the respective image, and having complementary apertures separated by opaque areas covering poles of each inverse filter, and converting the Fourier transforms into Fourier transforms to produce images of the object, and superimposing the images to produce an enhanced image.

2. A method as claimed in claim 1, wherein the step of forming Fourier transfore includes the use of a computer.

3. A method of enhancing X-ray images as claimed in claim 1, characterized in that the two images are X-ray images of one object obtained by means of X-ray sources having different focal spot configurations.

4. A device for enhancing images of an object comprising a plurality of optical channels, optical means for converting at least two images of the object blurred by different blurring factors of different imaging sources into Fourier transforms in separate optical channels, and in each channel one inverse Fourier transform optical filter of the blurring factor of the imaging source used to produce the respective image, a mask proximate each filter plane having complementary apertures separated by opaque areas covering the poles of each filter, and means for reconverting the Fourier transforms after passing through the filters into Fourier transforms to produce images of the object and for superimposing the resultant images to produce an enhanced image.

* * * * *

UNITED STATES PATENT AND TRADEMARK OFFICE
CERTIFICATE OF CORRECTION

PATENT NO. : 3,969,017
DATED : July 13, 1976
INVENTOR(S) : HANS DAMMANN

It is certified that error appears in the above-identified patent and that said Letters Patent are hereby corrected as shown below:

Col. 1, line 34, "1/P x $B_u$ = B x P x (1/p = B" should read --1/P x $B_u$ = B x P x (1/p) = B--;

Claim 2, line 2, "transfore" should be --transforms--;

Signed and Sealed this

Twenty-sixth Day of October 1976

[SEAL]

Attest:

RUTH C. MASON
Attesting Officer

C. MARSHALL DANN
Commissioner of Patents and Trademarks